(12) United States Patent
Hinz et al.

(10) Patent No.: US 7,648,350 B2
(45) Date of Patent: Jan. 19, 2010

(54) CONVEYING DEVICE

(75) Inventors: Axel Hinz, Neu-Anspach (DE); Uwe Greiff, Bad Homburg (DE); Günther Vogel, Dreieich (DE); Renè Lenz, Frankfurt/M (DE); Christoph Köhler, Kelkheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 709 days.

(21) Appl. No.: 11/387,483

(22) Filed: Mar. 23, 2006

(65) Prior Publication Data

US 2006/0159571 A1 Jul. 20, 2006

(30) Foreign Application Priority Data

Apr. 1, 2005 (DE) .................. 10 2005 015 298

(51) Int. Cl.
*F04B 39/10* (2006.01)
*F16K 15/14* (2006.01)
(52) U.S. Cl. ..................... 417/570; 137/860
(58) Field of Classification Search ........... 417/470, 417/570; 137/513, 513.5, 860, 513.3
See application file for complete search history.

(56) References Cited

U.S. PATENT DOCUMENTS

| 1,196,920 | A |   | 9/1916 | Astrom |
| 1,854,773 | A |   | 4/1932 | Tannehill |
| 2,313,284 | A |   | 3/1943 | Valentine |
| 3,493,270 | A | * | 2/1970 | Doerfler ............... 303/9.75 |
| 6,968,863 | B1 | * | 11/2005 | Roffelsen ............. 137/860 |

FOREIGN PATENT DOCUMENTS

| DE | 883562 | 7/1953 |
| DE | 19732771 | 2/1999 |
| DE | 19829124 | 8/1999 |
| DE | 19928164 | 12/2000 |

* cited by examiner

*Primary Examiner*—Charles G Freay

(57) ABSTRACT

A conveying device for a vehicle brake system, to convey pressure fluids into at least one vehicle brake, or to convey pressure fluids into a pressure fluid accumulator, or to convey pressure fluids into a master brake cylinder with at least one moveable piston (2) in a receptacle (4) to displace pressure fluids from a working chamber (5'), has at least one non-return valve (9, 9') to vent the working chamber (5) and to temporarily separate a hydraulic connection between the working chamber (5) and a hydraulic channel, whereby the non-return valve (9) must have at least one valve seat (11) and one valve body (12).

To achieve the simplest possible assembly of the non-return valve (9), the valve seat (11) is assembled from several special valve seat segments (13, 14).

16 Claims, 4 Drawing Sheets

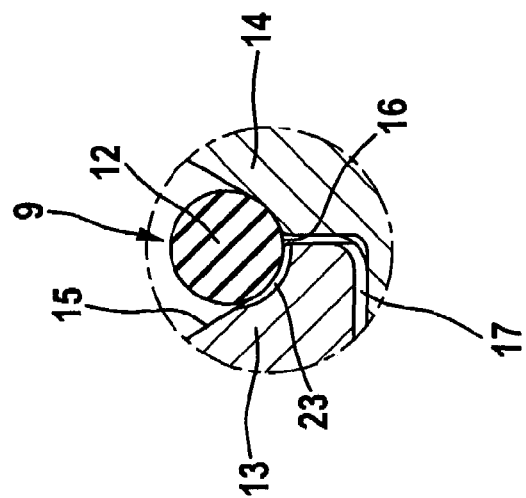
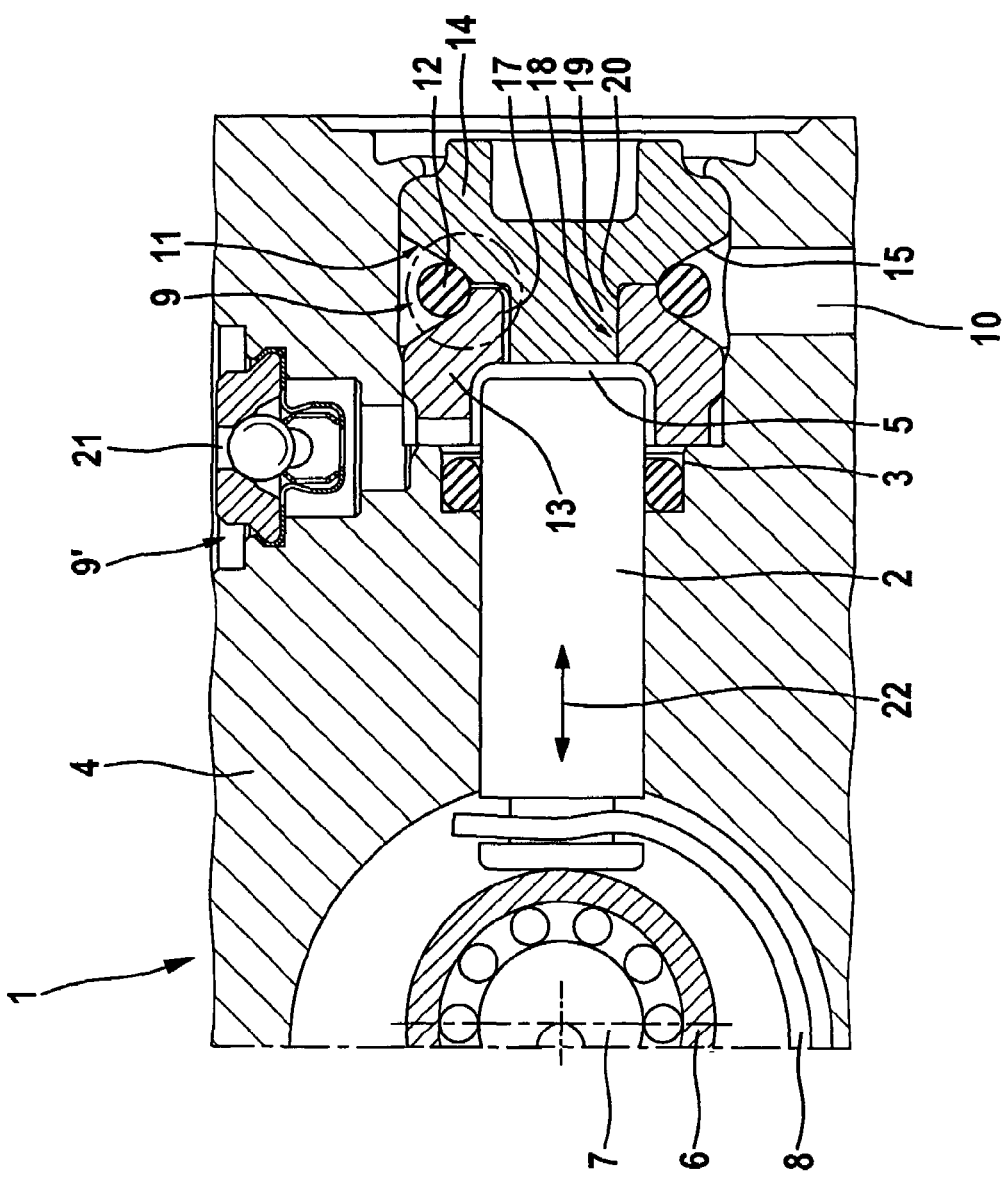
Fig. 1b
Fig. 1a

CONVEYING DEVICE

BACKGROUND OF THE INVENTION

The invention relates to a conveying device for a vehicle brake system, to convey pressure fluids into at least one vehicle brake, or to convey pressure fluids into a pressure fluid accumulator, or to convey pressure fluids into a master brake cylinder with at least one moveable piston in a receptacle to displace pressure fluids from a working chamber with at least one non-return valve to vent the working chamber with a suction or pressure channel. The non-return valve must have at least a valve seat and a valve body.

Conveying devices for vehicle brake systems are basically known from the art. A conveying device with non-return valves partially assembled from stampings and formed sheet metal can be found in DE 197 32 771 A1. Here the valve seat of the pressure valve is a one piece sheet metal stamping. The valve seat is attached to a guide bushing or to a receptacle by means of caulking. This allows for a low-cost production. However, especially thin-walled sheet metal parts have a tendency to warp. This tendency increases through the subsequent caulking processes of the valve seat. An uncontrolled warp of sealing-relevant parts—such as a valve seat in particular—cannot be tolerated. To avoid a raised scrap rate, a special quality assurance initiative, including the choice and production of raw materials seems necessary.

The object of the invention is to provide a simplified conveying device with a simplified non-return valve, which can be developed for a warp-free cold-forming production process without special expenditure.

SUMMARY OF THE INVENTION

The object is achieved in the present invention by assembling the valve seat from several valve seat segments. Segmented valve seats have a reduced warp risk. If there is any warp at all, it is limited to the respective valve seat segment. The other segments are largely untouched by this partial warp. An additional benefit is that several assembly elements act as a framework and strengthen each other, and possibly call for fewer raw materials. This opens the possibility to use different materials. Employing improved raw materials may optimize the scrap behavior for example, without having to build the one-piece valve seat from the same raw material.

Segmentation benefits include also a support surface of the valve body. The mentioned benefits will be especially realized in the support surface area for the valve body.

The intended benefit is that the valve body in a closed position will at least partially rest on the segmented support surfaces. Thus the valve body's stress is evenly distributed to all segments. In a preferred embodiment two valve seat segments are provided.

The drilling of the receptacle will be simplified by providing a passage for the pressure fluid between the valve seat segments. In other words, the drilling of channels or channel sections will not be necessary, because during the production of the valve seat segments these components will simply be manufactured by non-cutting shaping, pressing or stamping. At the same time, it saves the usually needed assembly space in the receptacle to perform the drilling.

There is another advantage if the mentioned pressure fluid passage is provided along a separating groove between the two valve seat segments. Because in the area of a separating groove the desired shaping and stamping operations can be performed with particular benefits. Furthermore is it possible to perform a channel-like stamping or removal just on certain valve seat segments, while other valve seat segments may be manufactured stamp-free. Finally it is readily possible to perform the channel-like stamping with all valve seat segments.

To achieve correct positions of the valve seat segments with respect to each other, the valve seat segments will be provided with centering elements for mutual alignment. Centering may be handled inside or outside. For example, at least one valve seat segment exhibits a lug, which is accommodated in a bore of another valve seat segment. Generally speaking, the manner of centering can be designed with most different means.

In a preferred embodiment, the valve seat segments in a stepped bore of a receptacle are provided by caulking.

A variant of the invention particularly reducing the packaging space avails reduced assembly time and few assembly parts, in that at least one of the valve seat segments is built like a bowl for the purpose of limiting a working chamber, through which the piston in its dead-center position will be at least partially held by the bowl-shaped area.

In further embodiments of the invention, it is planned that at least one of each compression channels and one of each suction channels open into the bore of the valve seat segments, whereby the alignment of the channels are coaxial to each other or parallel to each other, as well as perpendicular to the cylindrical axis of a piston.

Hereinafter the invention is explained by the drawing, which shows a preferred embodiment of the invention on a larger scale.

BRIEF DESCRIPTION OF THE DRAWINGS

In the drawings,
FIG. 1a shows sectional view of a conveying device
FIG. 1b shows a detail of FIG. 1a on a larger scale.

DETAILED DESCRIPTION OF THE DRAWINGS

Figure 2:
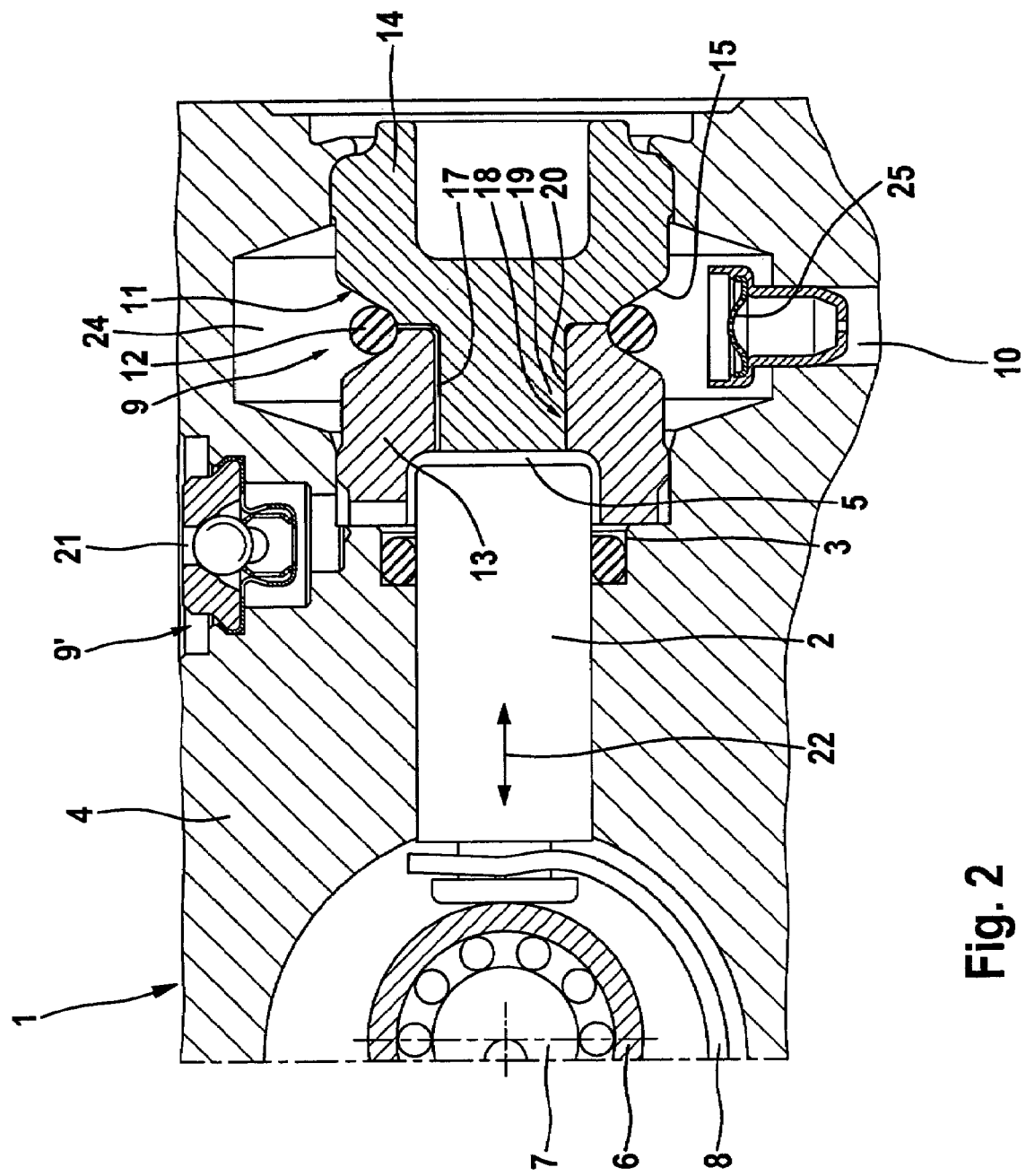
FIG. 2 shows sectional view of another embodiment.
Figure 3:
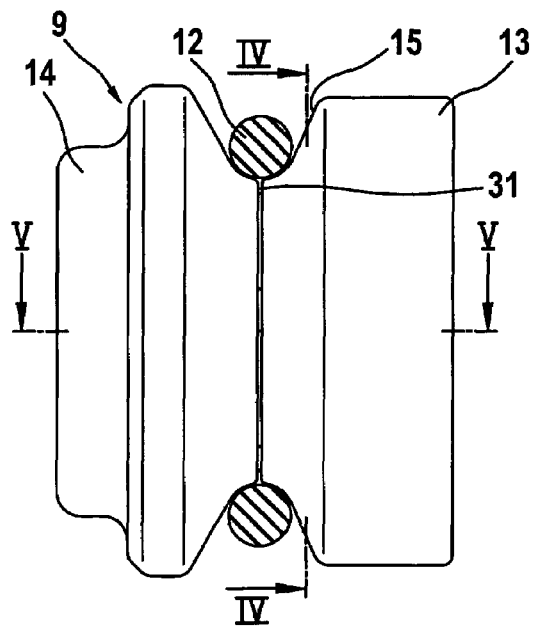
FIG. 3-9 show an additional special design of a non-return valve on a much enlarged scale.

The FIG. 1a shows a conveying device 1 with its rotation controlled piston 2 positioned in a stepped bore 3 in a receptacle 4. The piston 2 is part of an electro hydraulic aggregate furnished with an electronic control unit (ECU). The control of the piston 2 occurs directly in the receptacle 4, or in a guide bushing set in the bore 3. A combined solution is also conceivable.

The receptacle 4 also includes electro magnetic directional valves not shown, as well as channels not shown connecting to the valves, which allow pressure fluids at a controlled pressure boost to be conveyed from the working chamber 5 to a compression reservoir, not drawn, or to a vehicle brake, not drawn. This enables a vehicle's controlled braking, or a control program like an electronic stability program (ESP) or another control program, particularly a slip control.

The piston 2 indirectly abuts with one end by way of a roller bearing 6, a driving cam gear 7 which is rotated by the shaft of a non-depicted electrical motor. A tie-ring 8 connects two facing pistons respectively and thus enables an automatically controlled resetting to perform an induction stroke during the other piston's compression stroke.

A non-return valve 9 (pressure valve, suction valve 9') services the ventilation of the working chamber 11 by making a temporary connection between working chamber 5 and compression -/ suction channel possible, when the pressure in the working space exceeds an upper or lower limit. The non-return valve 9, 9' includes a valve seat 11 and a valve body 12.

As shown in FIG. 1a, the valve body 12 is o-ring-like, as well as elastically formed, which saves a separate resetting spring. However, in principle the invention is also conceivable with different valve components, which include the special resetting spring.

The valve seat 11 is assembled from several, at least two valve seat segments 13, 14, which are arranged in the stepped bore 3 of the receptacle 4. The two valve seat segments 13, 14 are essentially shaped cylindrically and together define a v-like and ring-like annular groove or notch, which is provided for the elastic, ring-like biased valve body 12, to close an outlet opening 16 in its original position. Thus, the valve seat 11 is put in place in segments on a plane which extends perpendicular to the cylindrical axis of the valve body. A pressure difference results in lifting the valve body 12 from its valve seat 11.

The support surfaces of the valve body 12 are also built in segments. Thus, the valve body 12—in a normal position—will at least partially rest on the segmented support surfaces of both valve seat segments 13, 14.

Along a separating groove between the valve seat segments 13, 14 runs a pressure fluid passage 17. The pressure fluid passage is built by at least one recess in one of the valve seat segments 13, 14. For instance, simple notching or stamping can do this removal. In addition, non-cutting, cold-forming processes are available, which have the advantage that no sharp edged chips occur to damage the elastic valve body 12. For larger passage diameters, both valve seat segments 13, 14 may be provided with opposite notches to form a larger channel diameter to enable higher rates of flow. In further modification of the invention several pressure fluid passages 17 could be provided to obtain increased rates of flow.

As can furthermore be seen in FIG. 1a, the valve seat segments 13, 14 are shaped like cylindrically bushings and, with the exception of the integrated pressure fluid passage, are built in rotational symmetry. Centering elements 18 serve for mutual alignment. In the preferred embodiment, at least one valve seat segment 14 exhibits a lug 19, which is accommodated in a bore 20 of the other valve seat segment 13.

An especially small axial construction length of the conveying device 1 is achieved when we dispense with the resetting spring in the working chamber. Instead, a coupling ring 8 is provided. Another contribution to miniaturization is that at least one of the valve seat segments 13 is bowl-shaped for the purpose of limiting the working chamber 5, and that the piston 2 in its dead-center position will be at least partially held by the bowl-shaped area. Thus, the piston 2 moves at least partially into the valve seat segment 13. Yet a relatively strong wall thickness of the valve seat segments 13, 14 is possible, which supports the warp resistance.

Furthermore, at least one of each compression channels 10 and one of each suction channels 21 open into the bore of the valve seat segments 13, 14. The two channels 10, 21 are coaxial to each other, or as shown in FIG. 1a are aligned in parallel to each other, as well as perpendicular to an cylindrical axis 22 of the piston 2.

FIG. 1b illustrates the following characteristic. Between the valve body 12 and the support surface, an intentional leakage is provided through by-pass channels 23. Consequently, each by-pass channel 23 by-passes the non-return valve 9 and connects the pressure side with the working chamber 5. This measure provides an intentional leakage to help decrease pressure thrusts and pulsations.

FIG. 2 shows a modified embodiment. Characteristics corresponding with FIG, 1 are indexed with corresponding reference numbers. Distinct from FIG. 1a, a ring-like damping chamber 24 is provided, which surrounds the non-return valve 9. A filter or strainer 25 is placed in front of the compressing channel 10.

FIGS. 3 through 9 show details of a non-return valve embodiment, whose channel design and valve seat shape have an especially low resistance and are optimized for the use by an o-ring-shaped valve body 12. Characteristics corresponding with the previous figures are indexed with corresponding reference numbers.

Figure 4:
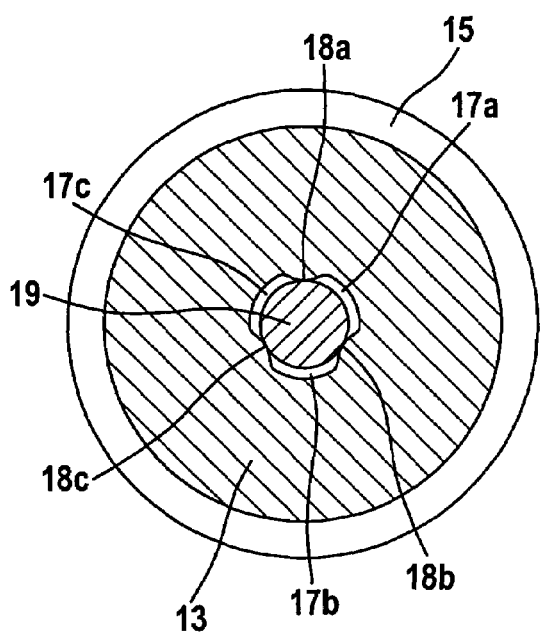
Figure 5:
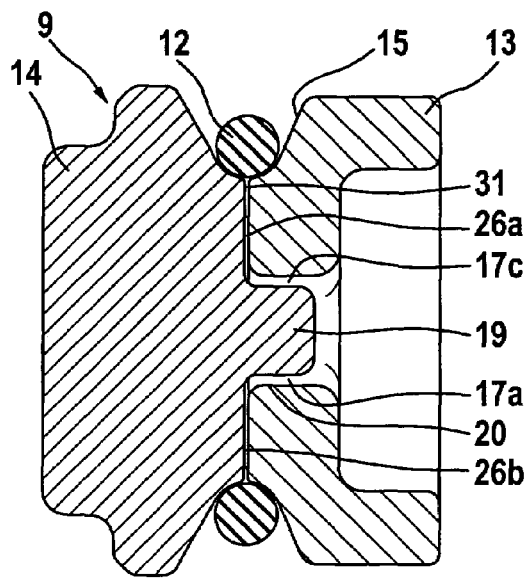
Figure 7:
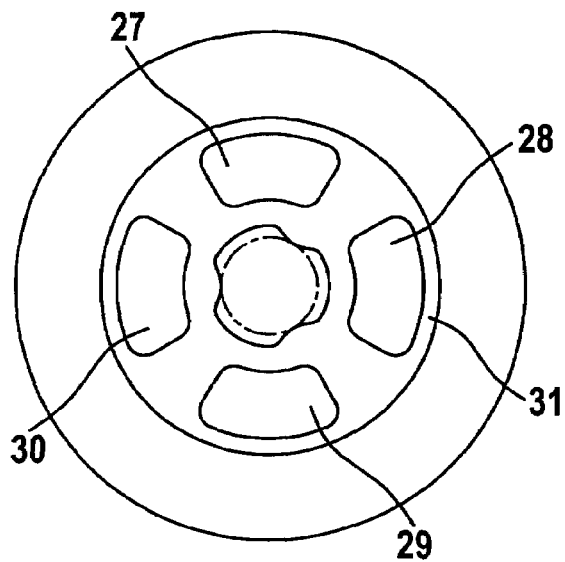
Figure 6:
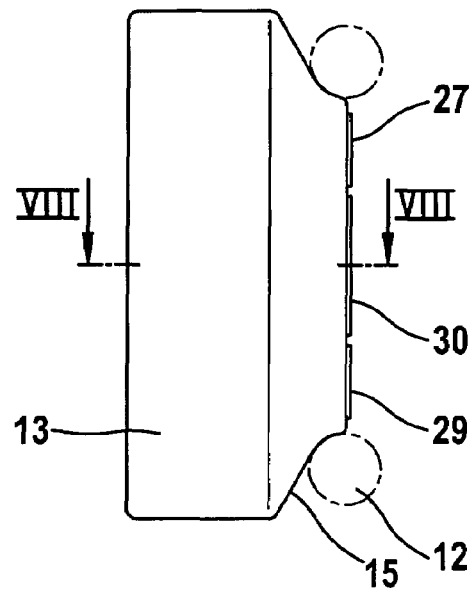
Figure 8:
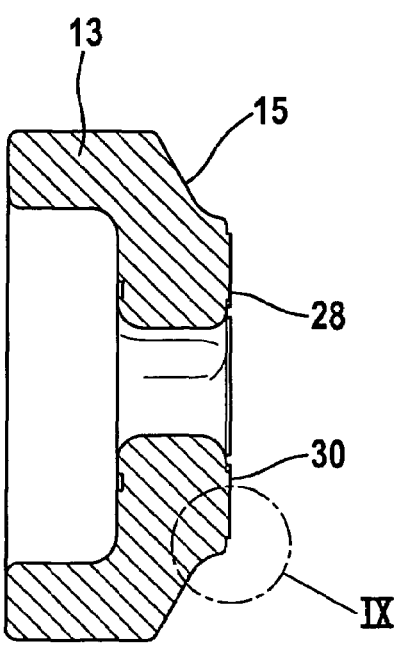

A first characteristic of this flow-optimized embodiment is particularly evident in FIG. 4 and consists of multiplying the axially aligned pressure fluid passage 17, which is arranged in a separating groove between the valve seat segments 13, 14.

An odd number of pressure fluid passages is especially recommended for the following reasons. By preference, three evenly distributed pressure fluid passages 17a, 17b, 17c are provided. The diameters of the pressure fluid passages 17a, 17b, 17c, particularly in peripheral direction, have been enlarged to such an extent that there is just barely enough space between the neighboring pressure fluid passages 17a, 17b, 17c for the regularly provided centering elements 18a, 18b, 18c. Thus, the centering elements 18a, 18b, 18c are also provided in an odd number. It is clearly evident in FIG. 4 that the focus is on achieving a large passage diameter. It is especially stressed to utilize odd numbered pressure fluid passages 17a, 17b, 17cand centering elements 18a, 18b, 18c, because this enables a low-cost, yet precise and positive static centering of both valve seat segments 13,14 to each other. Thus, in a simplest embodiment, three of the afore-mentioned features have to be provided.

A second characteristic of the embodiment according to FIGS. 3 through 9, is that radial sections 26a, 26b of the pressure fluid passages 17a, 17b, 17care brought about, by providing evenly placed stops 27, 28,29, 30 on their front side, between the valve seat segments, which protrude in an axial direction. There may be an even or odd number of stos. Preferably the stops are positioned on one of the valve seat segments 13, 14, so that the neighboring valve seat segment can be provided with a plane abutment surface. In FIGS. 6, 7, 8 and 9, the mentioned stops 27, 28, 29, 30 are clearly identifiable.

Figure 9:
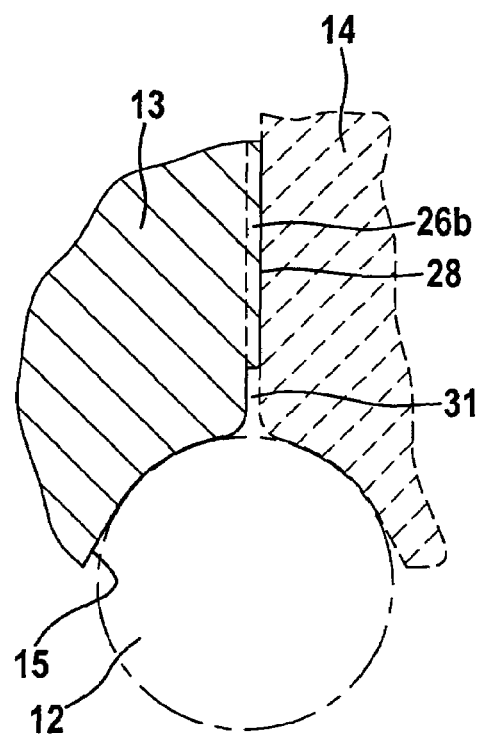

A third characteristic, which is particularly evident in FIG. 9, contributes to an enhanced durability of the elastic valve body 12. Accordingly, the individual radial sections 26a, 26b end in front of the valve body in an annular ring channel 31, which enables the pressure difference to attack the valve body with a level force and not a punctated force. This measure contributes immensely to increase the life-span of the valve body 12 and additionally reduces the flow resistance.

LIST OF REFERENCE NUMBERS

1 Conveying device
2 Piston
3 Bore
4 Receptacle
5 Working chamber
6 Roller bearing
7 Cam gear
8 Coupling ring
9, 9' Non-return valve
10 Compression channel
11 Valve seat
12 Valve body
13 Valve seat segment
14 Valve seat segment
15 Notch 16 Exit opening
17, a, b, c Pressure fluid passage
18, a, b, c Centering element
19 l Lug
20 Bore
21 Suction channel
22 Cylindrical axis
23 By-pass channel
24 Damping chamber
25 Filter
26a, b Radial section
27, 28, 29, 30 Stop
31 Ring channel

What is claimed is:

1. A conveying device for a vehicle brake system, to convey pressure fluid to at least one element within the brake system, the conveying device comprising at least one moveable piston (2) in a receptacle (4) to displace pressure fluids from a working chamber (5) with at least one non-return valve (9, 9') to vent the working chamber (5) and to temporarily separate a hydraulic connection between the working chamber (5) and a hydraulic channel, whereby the non-return valve (9, 9') comprises at least one valve seat (11) and one valve body (12), wherein the valve seat (11) is assembled from several valve seat segments (13, 14) that are provided with an odd number of centering elements (18a, 18b, 18c) that are positioned between pressure fluid passages (17a, 17b, 17c).

2. The conveying device as claimed in claim 1, wherein the valve seat segments (13, 14) exhibit a segmented support surface for the valve body (12).

3. The conveying device as claimed in claim 2, wherein the valve body (12) will at least partially rest on the segmented support surfaces of all valve seat segments (13, 14) when the non-return valve is closed.

4. The conveying device as claimed in claim 1, wherein two valve seat segments (13, 14) are provided.

5. The conveying device as claimed in claim 1, wherein at least one pressure fluid passage (17) is provided between the valve seat segments (13, 14).

6. The conveying device as claimed in claim 5, wherein the at least one pressure fluid passage (17) is provided along a separation groove between two valve seat segments (13, 14).

7. The conveying device as claimed in claim 5, wherein the at least one pressure fluid passage (17) is built by at least one recess in one of the valve seat segments (13, 14).

8. The conveying device as claimed in claim 7, wherein the valve seat segments (13, 14) are build as cold-formed parts and the recesses are stamped.

9. The conveying device as claimed in claim 5, wherein the at least one pressure fluid passage (17) is built by recesses in all valve seat segments (13, 14).

10. The conveying device as claimed in claim 5, wherein an odd number of pressure fluid passages (17a, 17b, 17c) is provided.

11. The conveying device as claimed in claim 5, wherein stops (27, 28, 29, 30) are provided between the valve seat segments (13, 14) to form radial sections (26a, 26b) of the pressure fluid passages.

12. The conveying device as claimed in claim 11, wherein the radial sections (26a, 26b) end in a annular ring channel (31).

13. The conveying device as claimed in claim 1, wherein the valve seat segments (13, 14) are provided in a stepped bore (3) of the receptacle (4).

14. The conveying device as claimed in claim 1, wherein one of the valve seat segments (13) is built like a bowl for the purpose of limiting a working chamber (5), and that the piston (2) will be at least partially, as well as in a dead-center position, held by the bowl-shaped area.

15. The conveying device as claimed in claim 13, comprising at least one compression channel (10) and at least one suction channel (21), which both open into the bore (3) of the valve seat segments (13, 14), wherein the channels are in alignment to each other and perpendicular to the cylindrical axis (22) of the piston (2).

16. A conveying device for a vehicle brake system, to convey pressure fluid to at least one element within the brake system, the conveying device comprising at least one moveable piston (2) in a receptacle (4) to displace pressure fluids from a working chamber (5) with at least one non-return valve (9, 9') to vent the working chamber (5) and to temporarily separate a hydraulic connection between the working chamber (5) and a hydraulic channel, whereby the non-return valve (9, 9') comprises at least one valve seat (11) and one valve body (12), wherein the valve seat (11) is assembled from several valve seat segments (13, 14) that are provided with centering elements (18 a, b, c) for mutual alignment and at least one of the valve seat segments (14) comprises a lug (19) which is accommodated in and spaced from a bore (20) of the other valve seat segment (13).

* * * * *